United States Patent
Clark et al.

(10) Patent No.: US 12,310,389 B2
(45) Date of Patent: May 27, 2025

(54) PH CONTROLLED COMPOSITION

(71) Applicant: General Mills, Inc., Minneapolis, MN (US)

(72) Inventors: Kenzi Clark, Minnetonka, MN (US); Rachel Eaton, Minneapolis, MN (US); James Fischer, Maplewood, MN (US); Eric T. Gugger, Plymouth, MN (US); Gargi A. Ramtirtha, Plymouth, MN (US); Nadja Ryan, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/480,786

(22) Filed: Sep. 21, 2021

(65) Prior Publication Data

US 2022/0095662 A1    Mar. 31, 2022

Related U.S. Application Data

(60) Provisional application No. 63/083,616, filed on Sep. 25, 2020.

(51) Int. Cl.
| | | |
|---|---|---|
| *A23L 29/00* | (2016.01) | |
| *A23B 2/754* | (2025.01) | |
| *A23C 9/152* | (2006.01) | |
| *A23G 1/32* | (2006.01) | |
| *A23G 1/54* | (2006.01) | |
| *A23G 3/36* | (2006.01) | |
| *A23G 3/54* | (2006.01) | |
| *A23L 25/00* | (2016.01) | |
| *A23L 25/10* | (2016.01) | |

(52) U.S. Cl.
CPC ............ *A23L 29/035* (2016.08); *A23B 2/754* (2025.01); *A23C 9/152* (2013.01); *A23G 1/32* (2013.01); *A23G 1/54* (2013.01); *A23G 3/36* (2013.01); *A23G 3/54* (2013.01); *A23L 25/10* (2016.08); *A23L 25/30* (2016.08)

(58) Field of Classification Search
CPC ...... A23L 29/035; A23L 3/3508; A23L 25/10; A23L 25/30; A23C 9/152; A23G 1/32; A23G 1/54; A23G 3/36; A23G 3/54; A23V 2002/00
See application file for complete search history.

(56) References Cited

U.S. PATENT DOCUMENTS

| | | | |
|---|---|---|---|
| 4,590,077 A | 5/1986 | Trop | |
| 4,919,944 A | 4/1990 | Bussiere et al. | |
| 5,009,914 A | 4/1991 | Serpelloni | |
| 9,888,706 B2 | 2/2018 | Ummadi et al. | |
| 2002/0187222 A1 | 12/2002 | Debbouz et al. | |
| 2004/0052909 A1* | 3/2004 | Contento | A23G 3/54 |
| | | | 426/580 |
| 2005/0170053 A1* | 8/2005 | Milani | B65B 9/12 |
| | | | 426/414 |
| 2006/0073239 A1 | 4/2006 | Boyle et al. | |
| 2006/0134279 A1 | 7/2006 | Rieser et al. | |
| 2007/0128324 A1 | 6/2007 | Lowe | |
| 2007/0148324 A1* | 6/2007 | Lin | A23L 7/117 |
| | | | 426/656 |
| 2008/0032029 A1* | 2/2008 | Aquino | A23L 33/20 |
| | | | 426/589 |
| 2011/0151095 A1* | 6/2011 | Abraham | A23G 3/007 |
| | | | 426/573 |
| 2014/0193540 A1 | 7/2014 | Lin et al. | |
| 2016/0143305 A1* | 5/2016 | Havlik | A23C 9/1315 |
| | | | 426/549 |

FOREIGN PATENT DOCUMENTS

| | | |
|---|---|---|
| CN | 1557188 | 12/2004 |
| CN | 103621663 | 3/2014 |
| EP | 0500132 | 8/1992 |
| EP | 1728440 | 12/2006 |
| EP | 1832180 | 9/2007 |
| GB | 1328263 | 8/1973 |
| JP | 60045570 | 3/1985 |
| JP | H0925493 A * | 1/1997 |
| JP | 2001252011 | 9/2001 |
| JP | 4827100 | 11/2011 |
| KR | 20000049729 | 8/2000 |
| KR | 20000053856 | 9/2000 |
| KR | 20020059141 | 7/2002 |
| KR | 100830835 | 5/2008 |
| WO | WO 1991/000690 | 1/1991 |
| WO | WO-2020010060 A1 * | 1/2020 ............. A23G 1/005 |

OTHER PUBLICATIONS

JPH0925493A—machine translation from Clarivate (Year: 1997).*
Wiley_Online_Appendix_E_Water_Activity_Values_of_Select_Food_Ingredients.pdf (Year: 2007).*
Mintel, *Cocoa Quark Bar*, http://www.gnpd.com, Nov. 27, 2018.
Boye et al., "Processing Foods Without Soybean Ingredients", Allergen Management in the Food Industry, pp. 355-391, 2010.

(Continued)

*Primary Examiner* — Nikki H. Dees
*Assistant Examiner* — Andrew E Merriam
(74) *Attorney, Agent, or Firm* — Rachel A. Kahler

(57) ABSTRACT

Compositions are described that use glucono delta lactone (GDL) in a portion of a composition containing two portions with differing water activities. GDL is included in a low water activity portion that is in contact with a high water activity portion, such that an interface formed between the two portions contains gluconic acid formed by contact of GDL with water from the high water activity portion. Methods of controlling pH in a composition containing two portions with differing water activities and methods of controlling microbial growth at an interface of two portions with differing water activities are also described.

15 Claims, No Drawings

(56) References Cited

OTHER PUBLICATIONS

Fly et al., "*Use of Glucono-Delta-Lactone in the Manufacture of Yogurt*", The Australian Journal of Dairy Technology, vol. 52, pp. 20-23, 1997.

Hamad, "*Effect of Adding Glucono-δ-Lactone, Different of Starters, Renet on the Chemical Composition, Yield and Economic Study of Kareish Cheese*", International Journal of Food Science and Nutrition Engineering, vol. 5, No. 3, pp. 130-140, 2015.

Henriques et al., "*Liquid Whey Protein Concentrates as Primary Raw Material for Acid Dairy Gels*", Food Science and Technology, vol. 40 No. 2, pp. 361-369, 2020.

Nishinari et al., "*Soy as a Food Ingredient*", Proteins in Food Processing, https://doi.org/10.1016/B978-0-08-100722-8.00007-3., 2018.

Walsh-O'Grady et al., "*A Rheological Study of Acid-Set "Simulated Yogurt Milk" Gels Prepared from Heat- or Pressure-Treated Milk Proteins*", Dairy Products Research Centre, Department of Life Sciences, University of Limerick, Ireland, pp. 637-650, 2001.

Ozcan et al., "*Yogurt Made from Milk Heated at Different pH Values*", J. Dairy Sci., No. 98, pp. 6749-6758, 2015.

Peng et al., *Impact of Preacidification of Milk and Fermentation Time on the Properties of Yogurt*, J. Dairy Sci., No. 92, pp. 2977-2990, 2009.

Purwandari et al., "*Rheological Properties of Fermented Mild Produced by a Single Exopolysaccharide Producing Streptococcus thermophilus Strain in the Presence of Added Calcium and Sucrose*", International Journal of Dairy Technology, vol. 62, No. 3, pp. 411-421, 2009.

Renan et al., "*Changes in the Rheological Properties of Stirred Acid Milk Gels as Induced by the Acidification Procedure*", Dairy Sc. Technol., No. 88, pp. 341-353, 2008.

Uysal et al., "*The Use of Glucono-δ-Lactone in the Manufacture of Torba Yoghurt*", Dept. of Technology, Faculty of Agriculture, No. 59, pp. 43-45, 2004.

Zhang et al., "*The Effect of Lactobacillus delbrueckii Subsp Blubaricus Proteinase on Properties of Milk Gel Acidified with Glucono-δ-Lactone*", International Journal of Food Science and Technology, No. 54, pp. 2094-2100, 2019.

\* cited by examiner

PH CONTROLLED COMPOSITION

CROSS REFERENCE TO RELATED APPLICATIONS

This application claims the benefit of U.S. Provisional Patent Application Ser. No. 63/083,616, filed on Sep. 25, 2020, and titled "pH Controlled Composition". The entire content of this application is incorporated by reference.

BACKGROUND

Low pH is often used in high water activity ($A_w$) compositions to reduce the risk of microbial growth to improve shelf life. Low pH is less critical to prevent microbial growth in low $A_w$ compositions because little water is available for microbial growth. However, contacting a high $A_w$ composition/low pH composition with a low $A_w$/higher pH composition can increase the pH of the high $A_w$ composition and/or increase the water activity of the low $A_w$ composition, and thus risk microbial growth in one or both compositions over time. Such compositions are typically maintained separately to ensure reduced risk of microbial growth, or they are assumed to have a reduced shelf life.

SUMMARY

The present disclosure relates to compositions that contain a high $A_w$ portion in contact with a low $A_w$ portion that contains glucono delta lactone (GDL) to form an interface. The interface includes gluconic acid, which is formed from interaction of GDL with water from the high $A_w$ portion and reduces the pH at the interface of the two portions.

A composition is provided herein that includes a first portion having a high water activity (Aw) having a first pH; and a second portion having a low Aw and having a second pH, the second portion comprising glucono delta lactone (GDL) and being in contact with the first portion to form an interface, the GDL included in the second portion in an amount sufficiently distributed throughout the second portion to provide an interface pH that is lower than the second pH. In some embodiments, the first pH can be lower than the second pH. In some embodiments, the first portion of composition provided herein can comprise an acidified milk composition. In some embodiments, the second portion of a composition provided herein can comprise a nut butter, chocolate, or a fat-based confectionary. In some embodiments, the second portion can form a solid coating or layer. In some embodiments, a composition can include a third portion having an interface with the second portion. In some embodiments, the third portion can comprise an edible inclusion. In some embodiments, the amount of GDL can be from 0.1 to 7% by weight of the second portion. In some embodiments, a composition provided herein can be an edible composition that has a shelf life at 4° C. of at least 55 days.

A method of controlling pH in a composition is provided herein that includes contacting a first portion of the composition with a second portion of the composition to form an interface, the first portion being high Aw and having a first pH, the second portion being low Aw and having a second pH, the second portion including GDL in an amount sufficiently distributed throughout the second portion to produce an interface pH that is below the second pH. In some embodiments, the first pH can lower than the second pH. In some embodiments, the first pH can be 4.6 or below and the second pH can be greater than 4.6. In some embodiments, the composition can include a third portion forming an interface with the second portion. In some embodiments, the third portion can comprise an edible inclusion. In some embodiments, the composition can be an edible composition with a shelf life of at least 55 days at 4° C.

A method of controlling microbial growth at an interface of a composition is also provided herein that includes contacting a first portion of the composition with a second portion of the composition to form the interface, the first portion being high Aw and comprising an antimicrobial compound, the second portion being low Aw and including GDL in an amount sufficiently distributed throughout the second portion to produce an interface pH that is sufficient to activate the antimicrobial compound. In some embodiments, the antimicrobial compound can comprise a sorbate and the interface pH can be 5.5 or less. In some embodiments, the composition can be an edible composition with a shelf life of at least 55 days at 4° C. In some embodiments, the first portion can comprise an acidified milk composition. In some embodiments, the second portion can comprise a nut butter, chocolate, or a fat-based confectionary.

These and various other features and advantages will be apparent from a reading of the following detailed description.

DETAILED DESCRIPTION

The present invention provides compositions that have an extended shelf life despite containing portions having differing water activity ($A_w$) in contact with each other. It was discovered, and is disclosed herein, that this can be surprisingly achieved by the use of glucono delta lactone (GDL) in a portion of a composition having a low A. This has a surprising benefit, over the shelf life of a composition, of reducing the risk of microbial growth at the interface of a low $A_w$ portion and a high $A_w$ portion in a single composition due to reduced pH at the interface, and in some cases, improving the functionality of one or more antimicrobial compound in the high $A_w$ portion at the interface. In addition, if the low $A_w$ portion has a higher pH than the high $A_w$ portion, the described compositions can inhibit basification of the high $A_w$ portion over shelf life.

Without being bound by theory, it is believed that GDL, which hydrolyses in contact with water to convert from a neutral molecule to gluconic acid, remains in a neutral state in a low $A_w$ composition portion except at an interface with a higher $A_w$ composition portion. It is believed to convert to gluconic acid at the interface providing an interface pH that is lower than the pH in the low $A_w$ composition portion. In addition, because many antimicrobial compounds, such as sorbates, benzoates, proprionate, nitrites, sulfites, acidulants (e.g., acetic acid or its salts, citric acid or its salts, or the like), acetates, nisin, and some natural preservatives (e.g., rosemary extract, green tea extract, and the like), have improved activity at acidic pH (e.g., below 7.0, below 6.0, or at 5.5 or below), GDL conversion to gluconic acid at an interface can improve antimicrobial activity at the interface.

The invention can provide a further benefit in edible compositions by mitigating an acidic flavor, often described as tart or sour, in a first food portion in which consumers find such a flavor undesirable, such as nut butter or chocolate, while maintaining a desired lower pH, microbial growth inhibition, and acidic flavor in a second food portion, such as yogurt or tomato sauce, in contact with the first food portion.

As used herein, the term "low $A_w$" with reference to a composition or a composition portion refers to a water activity level that is insufficient to convert GDL to gluconic acid in the composition or composition portion. Examples of water activities insufficient to convert GDL to gluconic acid include an $A_w$ of 0.5 or less, 0.4 or less, or 0.35 or less. In some cases, a low $A_w$ composition or composition portion can contain less than 5% water (e.g., less than 3%, or less than 2%) by weight of the composition or composition portion. To determine whether a composition or composition portion has an $A_w$ insufficient to convert GDL to gluconic acid, pH is measured before and after combining the composition or composition portion with 2.5% by weight GDL to form a mixture, and allowing the mixture to equilibrate for 6 hours at room temperature. If the pH of the mixture is not reduced by more than 0.05 relative to the composition or composition portion, the $A_w$ of the composition or composition portion is determined to be insufficient to convert GDL to gluconic acid. pH can be measured in any suitable way. In some cases, a low $A_w$ composition or composition portion can be diluted in water prior to measuring pH to ensure that the instrument used can measure pH. In such cases, pH should be measured immediately after dilution to ensure measurement is obtained before sufficient GDL is converted to significantly low pH.

As used herein, the term "high $A_w$," with reference to a composition or a composition portion refers to a water activity level that is at least 0.70 (e.g., at least 0.85, at least 0.9, or at least 0.95).

As used herein, the term "shelf life," generally refers to a specified period of time over which a composition has limited bacterial growth (e.g., less than 2 log increase, or less than 1 log increase) under specified conditions. For example, a composition having a shelf life of at least 30 days at room temperature has limited bacterial growth over the at least 30 days at 25° C. The term "shelf life" with reference to an edible composition, indicates that the composition is safe to eat over the indicated storage time and conditions. That is, a food product having a shelf life of at least 30 days at 4° C. is safe to eat over the at least 30 days when stored at 4° C. or below.

A composition provided herein includes a first portion having a high $A_w$ and a second portion having a low $A_w$ and containing GDL. The first and second portions are in contact with one other to form an interface. An interface between a first and second portion preferably does not include a barrier. However, if a barrier is present, it does not inhibit water from the first portion interacting with GDL in the second portion. An example of a suitable barrier can include a gelatin, a soluble starch, a porous paper, or the like.

In some embodiments, a first portion can be formulated or treated to inhibit at least some microbial growth. In some embodiments, a first portion can have a pH that is sufficiently low (e.g., below 5.0, or below 4.6) to prevent or reduce undesired microbial growth. For example, a first portion can be a milk (dairy or non-dairy) composition, such as yogurt, kefir, or acid milk, that is acidified either by addition of an acid or by fermentation. Although an acidified milk composition may, in some cases, include a live and active lactic acid bacteria culture, a pH of such an acidified milk composition can be sufficiently low to prevent growth of pathogenic bacteria, such as Salmonella, and other undesired microorganisms, such as yeasts and molds.

In some embodiments, a first portion can include an antimicrobial compound, such as a sorbate, nisin, acetic acid. Preferably, an antimicrobial compound in a first portion is active at a pH of 7.0 or less (e.g., at or below 6.0, or at or below 5.5).

In some embodiments, a first portion can be pasteurized or otherwise treated to kill microorganisms and/or reduce their growth.

A first portion can include any appropriate ingredient for its desired use, so long as the first portion has a high A. For example, in an edible composition, a first portion can contain one or a combination of edible ingredients. Suitable first portion compositions for an edible composition can include, for example, acidified dairy or non-dairy milk compositions (e.g., yogurt, kefir, and the like), fruit or vegetable purees (e.g., tomato sauce, or the like), and the like.

A second portion of a composition provided herein includes GDL in an amount sufficiently distributed throughout the second portion to provide a pH at the interface between the first portion and second portion that is lower than the pH of the second portion. That is, the amount and distribution of GDL throughout a second portion should be sufficient to result in conversion of GDL to gluconic acid at the interface. Generally, GDL in a second portion has sufficient mobility within the second portion to ensure that it can interact with water at the interface. However, the second portion should not be so fluid as to form a solution or fine dispersion or emulsion with a first portion over a shelf life without significant agitation or shear. Preferably, a second portion is formulated such that soluble solids within the second portion are not exposed to water within the second portion. For example, a second portion can be fat-based and/or contain little to no water.

In some embodiments, suitable compositions for a second portion include, for example, gels, viscous liquids, and semi-solid compositions. However, a second portion need not remain in a state that is liquid or semi-solid during production or over shelf life. For example, a second portion can be a liquid, semi-solid, or a gel when placed in contact with a first portion and then harden to form a layer or coating that has an interface with the first portion. In another example, a second portion can melt after being solid for at least some period of time. As such, a second portion that forms a solid coating or layer that interfaces with a first portion can provide a reduced pH at the interface to reduce the risk of microbial growth, even if the second portion is in a liquid or semi-solid state upon application to the first portion, or melts (intentionally or unintentionally) during shelf life.

Examples of compositions that can form a suitable second portion for an edible composition include, without limitation, a nut butter (e.g., peanut butter, almond butter, cashew butter or the like), chocolate, a fat-based confectionary (e.g., compound coatings, chocolate cream, nougat, praline filling, hazelnut cream, or the like), seed- or grain-based butters (e.g., oat butter, sunflower seed butter, or the like), or the like.

The amount of GDL can be adjusted based on the type and function of the composition. For example, in some embodiments, an amount of GDL in a second portion of an edible composition can be from about 0.1% to about 7% (e.g., about 1.5% to about 6.5%, or about 1.5% to about 4%) by weight of the second portion. Such an amount in an edible composition can ensure that the flavor of the second composition is not overly acidic while ensuring that there is sufficient GDL to interact with water at the interface with the first portion. In a non-edible composition, it may be possible to increase the GDL content so long as the pH of the second portion is not decreased by more than 0.05.

In some embodiments, a second portion can have a pH that is higher than the first portion. For example, in a composition where the first portion has a pH of 4.6 or below, the second portion can have a pH of greater than 4.6 (e.g., at least 4.8, at least 5.0, or at least 5.5). However, the second portion need not have a higher pH than the first portion to produce an interface pH sufficient to activate an antimicrobial compound. That is, the pH of the first and second portions need not be different, or in some cases a first portion can have a higher pH than the second portion, in order to activate an antimicrobial at the interface between a first and second portion.

In some embodiments, a second portion can be a single mass in contact with a first portion to form a single interface. In other embodiments, a second portion can be multiple masses that each form an interface where they contact the first portion. Similarly, a first portion can be a single mass or multiple masses forming one or more interfaces with a second portion.

In some embodiments, a third portion can be included in a composition. A third portion can have an interface with one or both of the first and second portions. In some embodiments a third portion can be formulated similarly to a first portion or a second portion. For example, a third portion can be formulated similarly to the second portion, except that it contains no GDL. In such an embodiment, a second portion can form a barrier between the first portion and the third portion.

In another example, a third portion can be formulated with a low $A_w$ and containing GDL, but otherwise different from the second portion. Such a third portion can form an interface with a first portion (or another high $A_w$ portion) to form a second interface where GDL can convert to gluconic acid to achieve the same benefits as the interface formed between the first and second portions.

In another example, a third portion can be a high $A_w$ composition that is different than the first portion. Such a composition can contact the second portion to form a second interface where GDL can convert to gluconic acid to achieve the same benefits as the interface formed between the first and second portions.

In another example, a third portion can comprise an edible inclusion, such as a nut or nut piece, a fruit piece, dried fruit, puffed grain, a protein puff, coffee bean, or the like. Such an inclusion can be coated or surrounded with a second portion, such as a compound coating, a nut butter, or a fat-based cream, that can limit exposure of the inclusion to water from the first portion, yet ensure a reduced pH at the surface of the inclusion if the second portion should melt or otherwise expose the inclusion to the first portion.

Thus, it can be seen that a first portion and second portion can be combined with various third portions to form interfaces that benefit from conversion of GDL to gluconic acid in a number of different configurations.

A composition provided herein can be manufactured in any suitable manner and packaged in any suitable way. For example, an edible composition can include a yogurt as a first portion, and a peanut butter containing GDL as a second portion. The yogurt can be any type (e.g., cup set or vat set; strained or unstrained) produced using any appropriate method and typically having a pH below 4.6, while the peanut butter can be produced using any appropriate method and typically having a pH above 4.6. The peanut butter can be combined with GDL at any point before placing it in contact with the yogurt. In an example, a peanut butter containing GDL can be placed in the bottom of a glass or plastic jar and the yogurt placed on top, or they may be placed side-by-side in a container before being sealed and stored at refrigerated temperatures. Such a yogurt and peanut butter composition can have a surprisingly long shelf life (e.g., at least 55 days or at least 60 days) without significantly increasing the pH of the yogurt or causing significant acidic flavor in the peanut butter.

The implementations described above and other implementations are within the scope of the following claims. One skilled in the art will appreciate that the present disclosure can be practiced with embodiments other than those disclosed. The disclosed embodiments are presented for purposes of illustration and not limitation.

For purposes of the present invention, the term "about" adds a margin of error of +/−10%. Accordingly, a mass of about 1.00 kilograms includes masses between 0.90 and 1.10 kilograms. Similarly, a range of about 1.00-1.20 kilograms includes masses between 0.90 and 1.32 kilograms. For numerical values expressed as percentages, the margin of error refers to the base numerical value. In other words, "about 20%" means 18-22% and not 10-30%.

What is claimed is:

1. An edible composition, comprising:
   a. a first portion comprising an acidified milk composition having a high water activity ($A_w$) of at least 0.70 and having a first pH; and
   b. a second portion comprising a nut butter having a low water activity ($A_w$) of 0.5 or less, a water content of less than 5% by weight of the second portion, and having a second pH, the second portion comprising glucono delta lactone (GDL) and being in contact with the first portion to form an interface between the first portion and second portion,
   wherein the GDL is included in the second portion in an amount of about 1.5% to about 6.5% by weight of the second portion and is sufficiently distributed throughout the second portion to provide a pH at the interface between the first portion and second portion that is lower than the second pH.

2. The composition of claim 1, wherein the first pH is lower than the second pH.

3. The composition of claim 1, wherein the second portion forms a solid coating or layer that contacts the first portion to form the interface between the first portion and second portion.

4. The composition of claim 1, wherein the composition includes a third portion having an interface with the second portion.

5. The composition of claim 4, wherein the third portion comprises an edible inclusion.

6. The composition of claim 1, wherein the composition is an edible composition that has a shelf life at 4° C. of at least 55 days.

7. A method of controlling pH in an edible composition, the method comprising contacting a first portion of the composition with a second portion of the composition to form an interface between the first portion and second portion, the first portion comprising an acidified milk composition having a water activity ($A_w$) of at least 0.70 and having a first pH, the second portion comprising a nut butter having a water activity ($A_w$) of 0.5 or less and having a second pH, the second portion including GDL in an amount of about 1.5% to about 6.5% by weight of the second portion,
   wherein the GDL is sufficiently distributed throughout the second portion to produce a pH at the interface between the first portion and second portion that is below the second pH.

8. The method of claim 7, wherein the first pH is lower than the second pH.

9. The method of claim 8, wherein the first pH is 4.6 or below and the second pH is greater than 4.6.

10. The method of claim 7, wherein the composition includes a third portion forming an interface with the second portion.

11. The method of claim 10, wherein the third portion comprises an edible inclusion.

12. The method of claim 7, wherein the composition is an edible composition with a shelf life of at least 55 days at 4° C.

13. A method of controlling microbial growth at an interface of an edible composition, the method comprising contacting a first portion of the composition with a second portion of the composition to form the interface, the first portion comprising an acidified milk composition having a water activity ($A_w$) of at least 0.70 and comprising an antimicrobial compound, the second portion comprising a nut butter having a water activity ($A_w$) of 0.5 or less and including GDL in an amount of about 1.5% to about 6.5% by weight of the second portion, wherein the GDL is sufficiently distributed throughout the second portion to produce a pH at the interface between the first portion and second portion that is sufficient to activate the antimicrobial compound.

14. The method of claim 13, wherein the antimicrobial compound comprises a sorbate and the interface pH is 5.5 or less.

15. The method of claim 13, wherein the composition is an edible composition with a shelf life of at least 55 days at 4° C.

\* \* \* \* \*